United States Patent Office 3,803,331
Patented Apr. 9, 1974

3,803,331
USE OF 2-METHYL-6-ETHOXYPYRAZINE FOR
PINEAPPLE FLAVOR
Jo-Fen Kung, North Bergen, N.J., and Martin F. Epstein,
Pearl River, N.Y., assignors to General Foods Corporation, White Plains, N.Y.
No Drawing. Filed June 28, 1972, Ser. No. 266,859
Int. Cl. A23l 1/26
U.S. Cl. 426—65            2 Claims

ABSTRACT OF THE DISCLOSURE

A flavoring agent, a method for imparting to foodstuffs the flavor and taste of fresh pineapple by adding thereto 2-methyl-6-ethoxypyrazine.

BACKGROUND OF THE INVENTION

The present invention relates to a new pyrazine derivative which is useful as a flavoring agent. More specifically, it relates to the use of 2-methyl-6-ethoxypyrazine to provide a fresh pineapple flavor to foodstuffs.

Prior to this invention, pyrazine derivatives have been known to impart a regular coffee flavor generally described by experts as green as evidenced in the British Patent No. 1,156,475 issued June 25, 1969. In addition, U.S. Pats. Nos. 3,622,346 and 3,328,402 issued Nov. 23, 1971 and June 27, 1967 teach the unique nutty, roasted flavors of the methoxypyrazines having potential application as additives to a variety of baked or toasted foodstuffs.

The pineapple flavor of 2-methyl-6-ethoxypyrazine is believed to be totally unique to the class of pyrazine derivatives.

SUMMARY OF THE INVENTION

It has been found that 2-methyl-6-ethoxypyrazine exhibits a strong odor and flavor of fresh pineapple. If incorporated into foodstuffs, it will impart a very refreshing taste of pineapple, the amount to be added depending on the system and the degree of flavoring effect desired but in no way limited by the same. This flavoring effect was very surprising since similar pyrazine derivatives, specifically the methoxypyrazines, exhibit a distinct roasted nutty flavor when employed in minute quantities as cited in the aforementioned references.

The advantages of using 2-methyl-6-ethoxypyrazine as a pineapple flavor are numerous. Being an extremely stable compound, it can be incorporated into any liquid or solid carrier for addition to an unlimited variety of systems where a pineapple flavor is desired.

It is therefore, a principal object of this invention to provide a composition to be incorporated into foodstuffs which affords a fresh pineapple flavor and aroma to the same.

DESCRIPTION OF THE INVENTION

The composition of this invention is prepared from a mixture of halogenated methylpyrazines, specifically, the 2,3 and 2,6-methylchloropyrazines.

These halogenated methylpyrazines can be prepared by known methods e.g. by treating methylpyrazine with hydrogen peroxide according to C. F. Koelsch and W. H. Gumprecht [Journal of Organic Chemistry, 23, 1603 (1958)], U.S. Pat. No. 3,328,402 issued June 27, 1967 and G. M. Nakel and L. V. Haynes [Journal of Agriculture and Food Chemistry, 20, 1682 (1972)] by reacting the resulting mixture of N-oxides with a phosphorus oxyhalide such as a phosphorus oxychloride. In this method a mixture two of possible three isomers of monochloronated methylpyrazine is obtained.

According to another method the halogenated methylpyrazines used as starting materials are prepared by direct halogenation of methylpyrazine with free halogens e.g. chlorine in carbon tetrachloride [cf. W. B. Lutz et al. Journal of Organic Chemistry 29, 415 (1964)]. Again, there is obtained a mixture of two isomers of monohalogenated methylpyrazine which, upon treatment with alkali metal ethoxide will yield a mixture of the corresponding isomers of methyl-ethoxypyrazine.

Specifically, when the mixture of 2,3 and 2,6-methylchloropyrazine is treated with sodium ethoxide a subsequent mixture of 2-methyl-3-ethoxypyrazine and 2-methyl-6-ethoxypyrazine is derived after which both isomers are separated by G.L.C. using a 15% OV–101, 1/8 inch x 12 foot column. The 2,3 isomer exhibits the expected nutty aroma whereas the 2,6 isomer manifests the unique pineapple flavor and aroma.

2-methyl-6-ethoxypyrazine is useful for flavoring an unlimited variety of systems. Depending upon the desired flavor note to be obtained, 2-methyl-6-ethoxypyrazine can be incorporated into such systems as such or together with other flavoring ingredients. Since 2-methyl-6-ethoxypyrazine possesses an exceptionally high flavoring power, minute quantities thereof are sufficient for producing the desired effects. For example, this invention finds utility in the manufacture of or for flavoring such products as "Kool-Aid," "Tang," "Jello," puddings, frozen confections, candies, cereals, jellies, dried fruits or wherever a fresh pineapple flavor is desired. It should be emphasized that the level of use of this compound is limited only by the degree of flavor sought to be obtained.

2-methyl-6-ethoxypyrazine is conveniently used in the form of a dilute solution in non-toxic edible solvents or diluents e.g. 1–10% solutions in order to achieve a uniform distribution in the systems to be flavored. Solvents or diluents which are suitable for this purpose include propylene glycol, triacetin, benzyl alcohol, practically tasteless oils such as peanut oil, glycerol and the like.

In accordance with this invention, 2-methyl-6-ethoxypyrazine is utilized with any food or drink of which it is desired to acquire the fresh pineapple taste thereof. Accordingly, the term "foodstuffs" as used herein embraces both solid foods and beverages which may have little or no food value. It should be obvious to those skilled in the art that this invention finds utility in non-food systems as well, e.g. pharmaceuticals, regardless of the apparent concentration on edible systems.

In the following examples, there are given specific formulae illustrative of the present invention. These formulae are not to be construed as restrictive of the invention, however, as it will be obvious to those skilled in the art that specific concentrations may be stated without limiting the scope of the invention as defined by the claims.

EXAMPLE I

A mixture of 2,3 and 2,6-methylchloropyrazine was prepared according to the method of Hirschberg and Spoerri [Journal of Organic Chemistry, 26, 2356 (1961)].

A 500 ml. 3-necked flask was equipped with a reflux condenser, dropping funnel and mechanical stirrer. The flask was charged with ethanol (200 ml.) and small pieces of sodium (6.5 gms., 0.28 mole) were added to the same. The isomer mixture of methylchloropyrazines (32.0 gms., 0.25 mole) was added dropwise and the solution subsequently refluxed for two hours.

The solution was subsequently concentrated and the precipitated sodium chloride was filtered. The residue was distilled under vacuum to yield a mixture comprising a major portion of 2-methyl-3-ethoxypyrazine and a minor fraction of 2-methyl-6-ethoxypyrazine. The 2,6-isomer was subsequently separated by G.L.C. using a 15% OV-101, ⅛ inch x 12 foot column. The 2,6-isomer derived had a distinct pineapple flavor and aroma.

EXAMPLE II

| | Parts by weight |
|---|---|
| Adipic Acid | 20.00–90.00 |
| 2-methyl-6-ethoxypyrazine fixed in gum arabic | .25–1.75 |
| FD&C yellow | .10–1.25 |
| Dextrose hydrate-sufficient to bring the total parts by weight to 100. | |

17.7 gms. of the above mix may be dissolved in two quarts of cold water and to this solution may be added 1–1.5 cups of sugar to prepare a pineapple flavored beverage. As an alternative, the sugar may be incorporated in the dry beverage mix rather than being added after the mix has been dissolved.

What is claimed is:

1. An artificially flavored foodstuff comprising a foodstuff and 2-methyl-6-ethoxypyrazine being present in an amount effective to impart a fresh pineapple flavor and aroma.

2. A method of flavoring a foodstuff which comprises adding to the foodstuff 2-methyl-6-ethoxypyrazine in an amount effective to impart a fresh pineapple flavor to the foodstuff.

References Cited

UNITED STATES PATENTS

| 3,622,346 | 11/1971 | Winter | 99—140 R |
| 3,702,253 | 11/1972 | Winter et al. | 99—140 X |
| 3,711,482 | 1/1973 | Mookherjee | 99—140 R X |
| 3,720,672 | 3/1973 | Buttery et al. | 99—140 R X |
| 3,746,711 | 7/1973 | Payne et al. | 260—250 |

JOSEPH M. GOLIAN, Primary Examiner

U.S. Cl. X.R.

260—250 R